(No Model.)

B. ARNOLD.
BICYCLE ALARM.

No. 569,158.  Patented Oct. 13, 1896.

Witnesses:
S. M. Snow
W. A. Drew

Inventor.
Benjamin Arnold.

UNITED STATES PATENT OFFICE.

BENJAMIN ARNOLD, OF EAST GREENWICH, RHODE ISLAND.

BICYCLE-ALARM.

SPECIFICATION forming part of Letters Patent No. 569,158, dated October 13, 1896.

Application filed July 13, 1896. Serial No. 598,976. (No model.)

*To all whom it may concern:*

Be it known that I, BENJAMIN ARNOLD, of East Greenwich, in the county of Kent and State of Rhode Island, have invented certain new and useful Improvements in Signaling Apparatus for Bicycles; and I do hereby declare that the following is a full, clear, and exact description thereof, reference being had to the accompanying drawings, and to the letters of reference marked thereon, which form a part of this specification.

This invention relates to that class of devices intended to signal the approach of a bicycle to avoid the chance of colliding with pedestrians and with other vehicles. It is fully explained and illustrated in this specification and the accompanying drawings.

Figure 2:
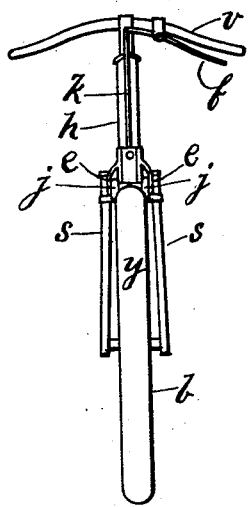
Figure 1:
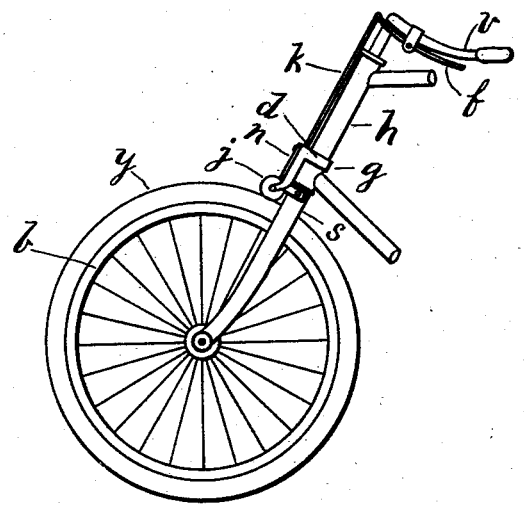
Figure 3:
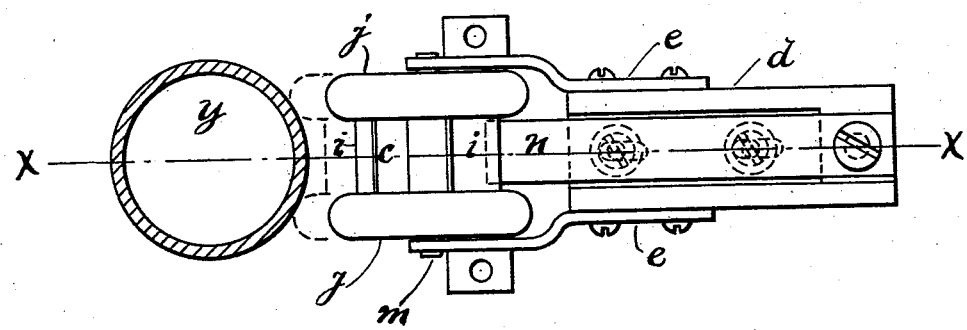
Figure 4:
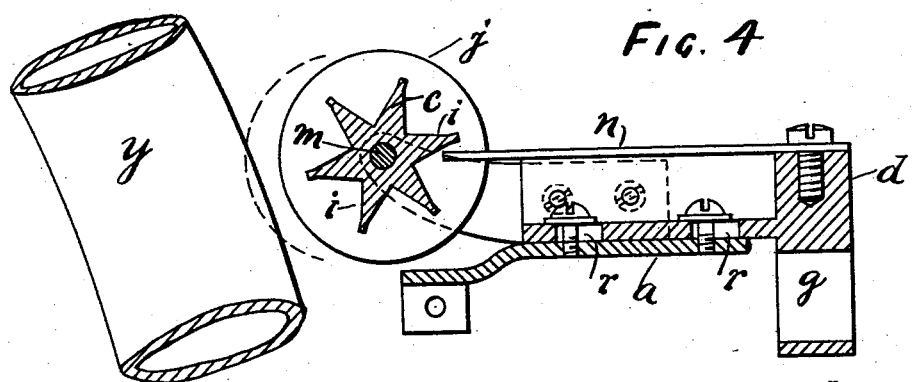

Figure 1 represents a part of a bicycle in side elevation with the signaling device attached to it, showing its position on the machine. Fig. 2 is a front elevation of the same, showing the connections for operating the signal. Fig. 3 is an enlarged front representation of the signaling device separate. Fig. 4 is an enlarged longitudinal section of the same taken on line $x\ x$, Fig. 3.

The object of this invention is to produce an inexpensive device to attach to bicycles that will give at will a short quick signaling sound that will compel attention because of its unusual and startling effect on those who hear it, as something is needed to supersede the bell now used, which, because of its many uses and familiar sound, fails to be heard or noticed in busy noisy streets without it is made inconveniently large for this purpose. Its construction and application to a bicycle are as follows:

A light plate $a$, made preferably of sheet metal, the lower end of which extends out on each side and is bent to the shape necessary to attach it by means of screws to the fork $s$ of the bicycle just above the wheel $b$. A block $d$, preferably made of wood for lightness, is arranged to slide on the plate $a$ either by turning up the sides of the plate and making slots in them and putting screws through the slots into the block $d$ or by putting the screws $f'\ f'$ through the slots $r\ r$ in the plate instead, and a ring $g$ is fitted to slide easily on the rod $h$ and fastened to the upper end of the block $d$, so that while the whole device is attached to and swings around with the fork $s$ and wheel $b$ the block $d$ is free to slide up and down a short distance on the rod $h$ and plate $a$, its upper end being securely held to the rod by the ring $g$.

Two plates $e\ e$ are made fast, one on each side of the lower end of the block $d$, and holes made in their lower ends to form bearings for a short shaft $m$. This shaft $m$ has a wheel $c$ with deep triangular notches cut in its periphery to form V-shaped teeth $i\ i$, and a rubber wheel $j$ is made fast on one side or one on each side of the wheel $c$.

A tongue $n$ has one end made fast to the upper end of the block $d$ and its lower end extended in between the notches $i$ in the wheel $c$, so that when that wheel is revolved and one of the teeth catches on the end of the tongue $n$ and presses it down and passes by it it will snap back and strike the under face of the next tooth and will remain free to vibrate for an instant, making a cracking sound having great penetrating effect when made in rapid succession like a discharge of firearms.

To operate the signal at the pleasure of the rider, a rod $k$ is connected at one end to the upper end of the block $d$ and carried up to the inner end of a lever $f$, held near its middle on a pin in a bracket fast on one of the handle-bars $v$. The outer end of the lever $f$ is carried down toward the outer end of the handle-bar so as to be easily grasped by the hand when on the handle. When it is desired to sound the signal, the lever $f$ is clasped by the hand to the bar and the inner end of the lever will push down the block $d$ by the rod $k$, so that the rubber wheel $j$ will bear on the tire $y$ of wheel $b$ and be revolved rapidly, causing the notched wheel $c$ to vibrate the end of the tongue $n$ in quick succession and produce a sound that can be heard and distinguished from all other sounds at a great distance, because of its unusual character, and it will also by its effect indicate the speed at which the machine is moving. This adaptation of a modification of the principle of the watchman's rattle produces a convenient, inexpensive, and very effective signaling apparatus.

Having thus described my improvement, I claim as my invention and desire to secure by Letters Patent—

In a bicycle-signal the following instrumentalities: a plate, with means for attaching it rigidly to the front fork, a block slidingly attached to said plate, a notched wheel fast on a shaft, bearings on the sides of the block to hold said shaft, a flat resilient tongue attached at one end to said block and having its free end in one of the notches in said wheel, a friction-wheel also fast on said shaft in position to rest on the front wheel of the bicycle, with means for sliding the block up and down, substantially as described.

In testimony whereof I have hereunto set my hand this 4th day of August, A. D. 1896.

BENJAMIN ARNOLD.

In presence of—
    JAMES W. RICHARDSON,
    L. J. BUSH.